(12) United States Patent
Cervantez

(10) Patent No.: US 12,125,050 B2
(45) Date of Patent: *Oct. 22, 2024

(54) SECURITY POLICY ENFORCEMENT

(71) Applicant: Amazon Technologies, Inc., Reno, NV (US)

(72) Inventor: Michael Jerry Cervantez, Fairfax, VA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/235,541

(22) Filed: Aug. 18, 2023

(65) Prior Publication Data

US 2023/0394501 A1 Dec. 7, 2023

Related U.S. Application Data

(63) Continuation of application No. 18/091,682, filed on Dec. 30, 2022, now Pat. No. 11,810,130, which is a
(Continued)

(51) Int. Cl.
G06Q 30/00 (2023.01)
G06Q 20/40 (2012.01)
G06Q 30/018 (2023.01)

(52) U.S. Cl.
CPC ......... G06Q 30/0185 (2013.01); G06Q 20/40 (2013.01)

(58) Field of Classification Search
CPC .............. G06Q 30/0185; G06Q 20/40
See application file for complete search history.

(56) References Cited

U.S. PATENT DOCUMENTS 5,493,273 A * 2/1996 Smurlo ................. G08B 29/16
340/552
9,009,819 B1 4/2015 Savant
(Continued)

FOREIGN PATENT DOCUMENTS

CN 101051292 A * 10/2007
CN 105468887 2/2009
(Continued)

OTHER PUBLICATIONS

Neda Halvaiee, "A novel model for credit card fraud detection using Artificial Immune systems" 2014, Applied Soft Computing 24, pp. 40-49. (Year: 2014).*

(Continued)

*Primary Examiner* — Tan D Nguyen
(74) *Attorney, Agent, or Firm* — Hogan Lovells US LLP

(57) ABSTRACT

Requests to perform activity with respect to a customer account can be monitored to attempt to detect fraudulent activity due to compromised customer credentials or other unauthorized access. The unauthorized party can request actions such as to create a new account, mount a snapshot of customer data, and exfiltrate the customer data. Various embodiments monitor such requests and permissions granted to accounts not directly owned by a customer, and can apply automatic mitigations for suspicious activity in order to reduce the risk of exposing data to unauthorized accounts. Such an offering determines mitigations to perform, such as to block, alert, rate limit, or terminate the linked or non-linked account based on account reputation. The detection mechanism can use various heuristics to make mitigation decisions, as may consider factors such as account age, geolocation, access history, device fingerprint, network domain, payment type, prior suspicious activity, and the like.

20 Claims, 6 Drawing Sheets

Related U.S. Application Data continuation of application No. 15/439,595, filed on Feb. 22, 2017, now Pat. No. 11,605,093.

(56) References Cited

U.S. PATENT DOCUMENTS

| | | | |
|---|---|---|---|
| 9,043,894 B1 | 5/2015 | Dennison | |
| 9,804,752 B1 | 10/2017 | Mall | |
| 2001/0029496 A1* | 10/2001 | Otto | G06Q 20/385 705/74 |
| 2002/0078381 A1* | 6/2002 | Farley | H04L 43/00 726/23 |
| 2003/0014379 A1* | 1/2003 | Saias | G06Q 10/06 706/45 |
| 2003/0023543 A1* | 1/2003 | Gunewardena | G06Q 40/03 705/38 |
| 2003/0040855 A1 | 2/2003 | Pattok | |
| 2003/0120614 A1 | 6/2003 | Shumpert | |
| 2004/0064401 A1* | 4/2004 | Palaghita | G06Q 40/02 705/38 |
| 2005/0022000 A1* | 1/2005 | Inomata | G06F 21/552 726/26 |
| 2005/0108063 A1* | 5/2005 | Madill, Jr. | G06Q 40/08 705/4 |
| 2008/0140365 A1* | 6/2008 | Kawakami | G03F 1/36 703/2 |
| 2010/0100512 A1 | 4/2010 | Brodin | |
| 2010/0130172 A1* | 5/2010 | Vendrow | H04M 15/58 455/411 |
| 2011/0276468 A1* | 11/2011 | Lewis | G06Q 20/3674 705/38 |
| 2012/0084865 A1* | 4/2012 | Niemela | G06F 21/563 726/24 |
| 2015/0164349 A1 | 6/2015 | Gopalakrish | |
| 2015/0271446 A1 | 9/2015 | Browne | |
| 2015/0356489 A1 | 12/2015 | Kazai | |
| 2016/0359828 A1* | 12/2016 | Thormaehlen | H04W 12/02 |
| 2017/0193619 A1* | 7/2017 | Rollins | G06Q 50/184 |
| 2017/0337392 A1 | 11/2017 | Dang | |
| 2017/0357771 A1 | 12/2017 | Connolly | |

FOREIGN PATENT DOCUMENTS

| | | | | |
|---|---|---|---|---|
| CN | 101408969 A * | 4/2009 | | |
| CN | 103401835 | 11/2013 | | |
| CN | 105516165 A * | 4/2016 | | H04L 29/06 |
| CN | 105550927 | 5/2016 | | |
| CN | 106844138 | 6/2017 | | |
| KR | 101640867 | 7/2016 | | |
| WO | WO-2005048045 A2 * | 5/2005 | | G06Q 20/04 |
| WO | 2011063269 | 5/2011 | | |
| WO | 2012129400 | 9/2012 | | |
| WO | 2015081166 | 6/2015 | | |
| WO | WO-2016041420 A1 * | 3/2016 | | H04W 72/04 |
| WO | 2016094330 | 6/2016 | | |

OTHER PUBLICATIONS

Kuldeep Randhawa, "Credit Card Fraud Detection Using AdaBoost and Majority Voting," 2018, IEEE Access, pp. 14277-14284. (Year: 2018).*
Rabi Padhy, "Cloud Computing: Security Issues and Research Challenges", Dec. 2011, IRACST—International Journal of Computer Science and Information Technology & Security, vol. 1, No. 2, pp. 136-146. (Year: 2011).
Umut Ozertem, "Learning to Suggest: A Machine Learning Framework for Ranking Query Suggestions," 2012, SIGIR'12, Aug. 12-16, 2012, pp. 25-34. (Year: 2012).
Lan Zhou, "Achieving Secure Role-Based Access Control on Encrypted Data in Cloud Storage", 2013, IEEE Transactions on Information Forensics and Security, vol. 8, No. 12, Dec. 2013, pp. 1947-1960. (Year: 2013).
Farzad Sabahi, "Cloud Computing Security Threats and Responses", 2011, IEEE, pp. 245-249. (Year: 2011).
Donghee Choi, "A Framework for Context Sensitive Risk-Based Access Control In Medical Information Systems", Apr. 2015, Computational and Mathematical Methods in Medicine, 9 pages, Apr. 15, 2015 (Year: 2015).
Non-Final Rejection issued in U.S. Appl. No. 15/439,595, dated Apr. 30, 2020.
Final Rejection issued in U.S. Appl. No. 15/439,595, dated Nov. 20, 2020.
Non-Final Rejection issued in U.S. Appl. No. 15/439,595, dated Jun. 24, 2021.
Final Rejection issued in U.S. Appl. No. 15/439,595, dated Feb. 2, 2022.
Non-Final Rejection issued in U.S. Appl. No. 15/439,595, dated Jun. 17, 2022.
Notice of Allowance issued in U.S. Appl. No. 15/439,595, dated Nov. 18, 2022.
Non-Final Rejection issued in U.S. Appl. No. 18/091,682, dated May 25, 2023.
Notice of Allowance issued in U.S. Appl. No. 18/091,682, dated Jun. 28, 2023.
Kambiz Ghazinour, "An Autonomous Model to Enforce Security Policies Based on User's Behavior", 2015, IEEE, pp. 1-5. (Year: 2015)
Elisa Costante, "A Machine Learning Solution to Assess Privacy Policy Completeness," 2012, IEEE, pp. 91-96. (Year: 2012).
Saurav Nanda, "Predicting Network Attack Patterns in SDN using Machine Learning Approach", 2016, IEEE Conference on Network Function Visualization and Software Denied Network, pp. 1-6. (Year: 2016).

* cited by examiner

SECURITY POLICY ENFORCEMENT

CROSS-REFERENCES TO RELATED APPLICATIONS

This application is a continuation of allowed U.S. patent application Ser. No. 18/091,682, filed Dec. 30, 2022, which claims the benefit of priority to and is a continuation of U.S. patent application Ser. No. 15/439,595, filed Feb. 22, 2017, now U.S. Pat. No. 11,605,093 both entitled "SECURITY POLICY ENFORCEMENT," the entire disclosures of which are incorporated by reference for all intents and purposes.

BACKGROUND

Users are increasingly performing tasks using remote computing resources, often referred to as part of "the cloud." This has many advantages, as users do not have to purchase and maintain dedicated hardware and software, and instead can pay for only those resources that are needed at any given time, where those resources typically will be managed by a resource provider. Users can perform tasks such as storing data to various types of resources offered by a resource provider. In many instances, customer data is accessible through mechanisms such as roles or credentials. A party obtaining the credentials or assuming such a role, however, can gain access to the customer data. It is difficult to determine whether such usage is authorized, as well as to take appropriate action before any customer data is exfiltrated.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches described and suggested herein relate to the management of data in an electronic environment. In particular, requests made using various customer credentials, or associated with various customer accounts, can be monitored and attempts made to determine whether the activity is suspicious or potentially fraudulent. Various security policies may apply to customer accounts. It is possible, however, that an unauthorized party can gain access to customer credentials on the account so as to gain unauthorized access. That party can then perform actions such as to create a new account, mount a snapshot of the customer data, and exfiltrate the data to a location outside the trusted customer account. Approaches presented herein can monitor these access requests and permissions granted to accounts not directly owned by a customer, and can apply automatic mitigations for suspicious activity in order to reduce the risk of exposing data to unauthorized accounts and enforce the relevant policies. Such an offering can determine the mitigations to perform, such as to block, alert, rate limit, or terminate the linked or non-linked account based on account reputation and other such factors. The detection mechanism can use various heuristics to make mitigation decisions, as may consider factors such as account age, geolocation, access history, device fingerprint, network domain, payment type, prior suspicious activity, and the like.

Various other such functions can be used as well within the scope of the various embodiments as would be apparent to one of ordinary skill in the art in light of the teachings and suggestions contained herein.

Figure 1:
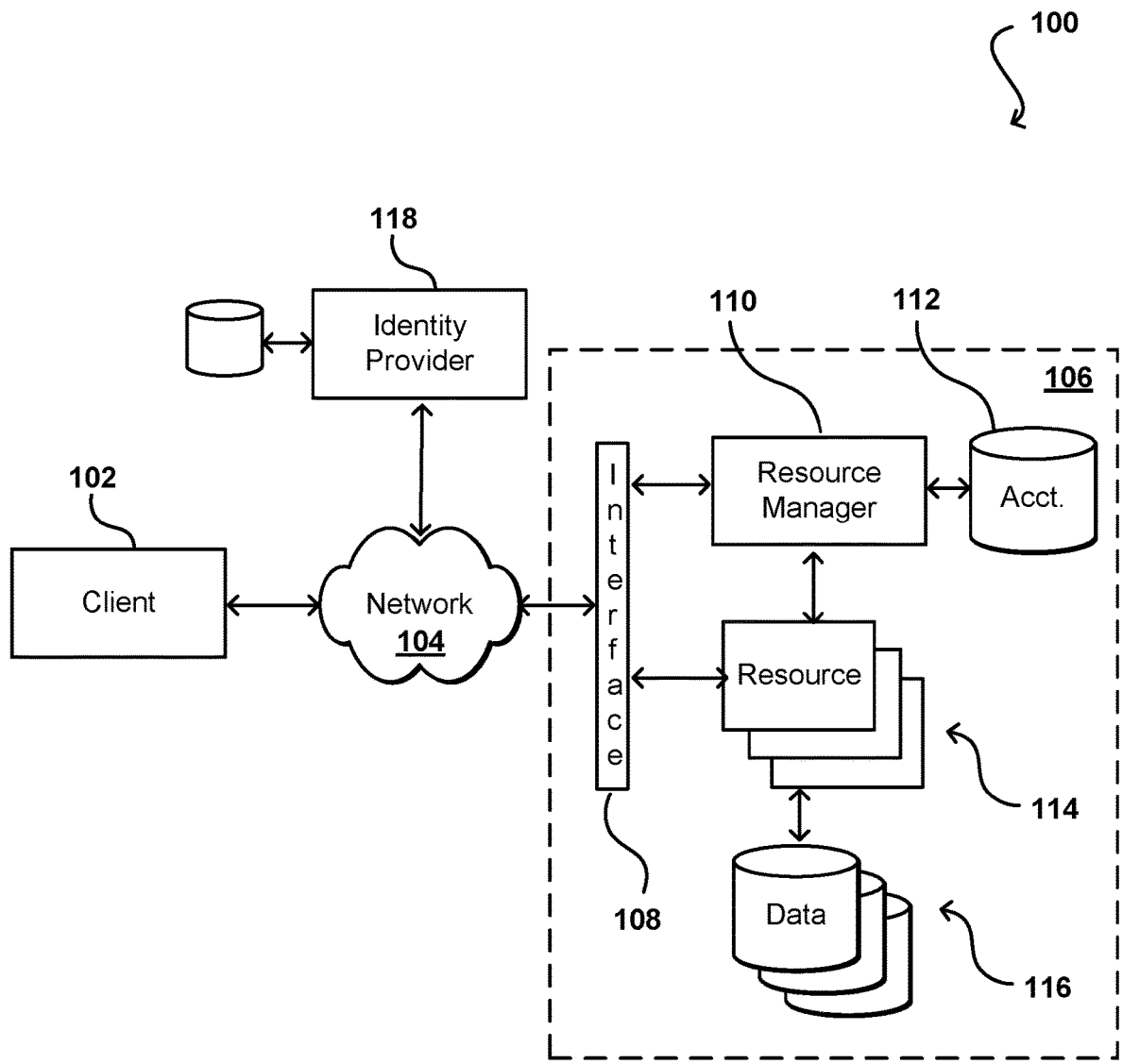
FIG. 1 illustrates an example environment in which various embodiments can be implemented.

FIG. 1 illustrates an example environment 100 in which aspects of the various embodiments can be implemented. In this example a user is able to utilize a client device 102 to submit requests across at least one network 104 to a resource provider environment 106. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 104 can include any appropriate network, including an intranet, the Internet, a cellular network, a local area network (LAN), or any other such network or combination, and communication over the network can be enabled via wired and/or wireless connections. The resource provider environment 106 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of electronic resources that can be utilized by multiple users for a variety of different purposes. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of electronic resources 114 of one or more types. These types can include, for example, application servers operable to process instructions provided by a user or database servers operable to process data stored in one or more data stores 116 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 114 can submit a request that is received to an interface layer 108 of the provider environment 106. The interface layer can include application programming interfaces (APIs) or other exposed interfaces enabling a user to submit requests to the provider environment. The interface layer 108 in this example can also include other components as well, such as at least one Web server, routing components, load balancers, and the like. When a request to provision a resource is received to the interface layer 108, information for the request can be directed to a resource manager 110 or other such system, service, or component configured to manage user accounts and information, resource provisioning and usage, and other such aspects. A resource manager 110 receiving the request can perform tasks such as to authenticate an identity of the user submitting the request, as well as to determine whether that user has an existing account with the resource provider, where the account data may be stored in at least one data store 112 in the provider environment. A user can provide any of various types of credentials in order to authenticate an identity of the user to the provider. These credentials can include, for example, a username and password pair, biometric data, a digital signature, or other such information. These credentials can be provided by, or obtained from, a number of different entities, such as an identity provider 118, a key management service, a corporate entity, a certificate authority, an identify broker such as a SAML provider, and the like. In some embodiments, a user can provide information useful in obtaining the credentials, such as user identity, account information, password, user-specific cryptographic key, customer number, and the like. The identity provider can provide the credentials to the resource provider environment 106 and/or to the client device 102, whereby the client device can utilize those credentials to obtain access or use of various resources in the provider environment, where the type and/or scope of access can depend upon factors such as a type of user, a type of user account, a role associated with the credentials, or a policy associated with the user and/or credentials, among other such factors.

The resource provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 102 to communicate with an allocated resource without having to communicate with the resource manager 110, at least until such time as a relevant aspect of the user account changes, the user is no longer granted access to the resource, or another such aspect changes. The same or a different authentication method may be used for other tasks, such as for the use of cryptographic keys. In some embodiments a key management system or service can be used to authenticate users and manage keys on behalf of those users. A key and/or certificate management service can maintain an inventory of all keys certificates issued as well as the user to which they were issued. Some regulations require stringent security and management of cryptographic keys which must be subject to audit or other such review. For cryptographic key pairs where both public and private verification parameters are generated, a user may be granted access to a public key while private keys are kept secure within the management service. A key management service can manage various security aspects, as may include authentication of users, generation of the keys, secure key exchange, and key management, among other such tasks.

The resource manager 110 (or another such system or service) in this example can also function as a virtual layer of hardware and software components that handles control functions in addition to management actions, as may include provisioning, scaling, replication, etc. The resource manager can utilize dedicated APIs in the interface layer 108, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 108 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

As mentioned, in various embodiments a customer of such a resource provider environment might utilize one or more credentials in order to authenticate that customer's identity. In some embodiments the customer may then assume a role with permissions granted under those credentials according to one or more security policies or other such mechanisms. The customer can be associated with one or more accounts with the resource provider, which may or may not be linked in the system. It can be desirable, in at least some embodiments, to automatically enforce relevant security policies on any or all of these accounts. The permissions granted under these credentials and/or roles, however, enable the customers to perform actions that are difficult to determine as fraudulent, as least on a time scale necessary to prevent the unauthorized access of data or other resources in the resource provider environment. An unauthorized entity gaining access to the roles and/or credentials can potentially leverage these compromised credentials to obtain access to various resources and data associated with other customer accounts. In some embodiments, this granted or obtained access can be used to exfiltrate another customer's data from the resource provider environment. Because the correct valid credentials were used to obtain the access, however, it can be difficult to determine whether the access was fraudulent, at least in an automated and near real-time fashion that is needed to prevent the exfiltration of data before it happens.

Figure 2A:
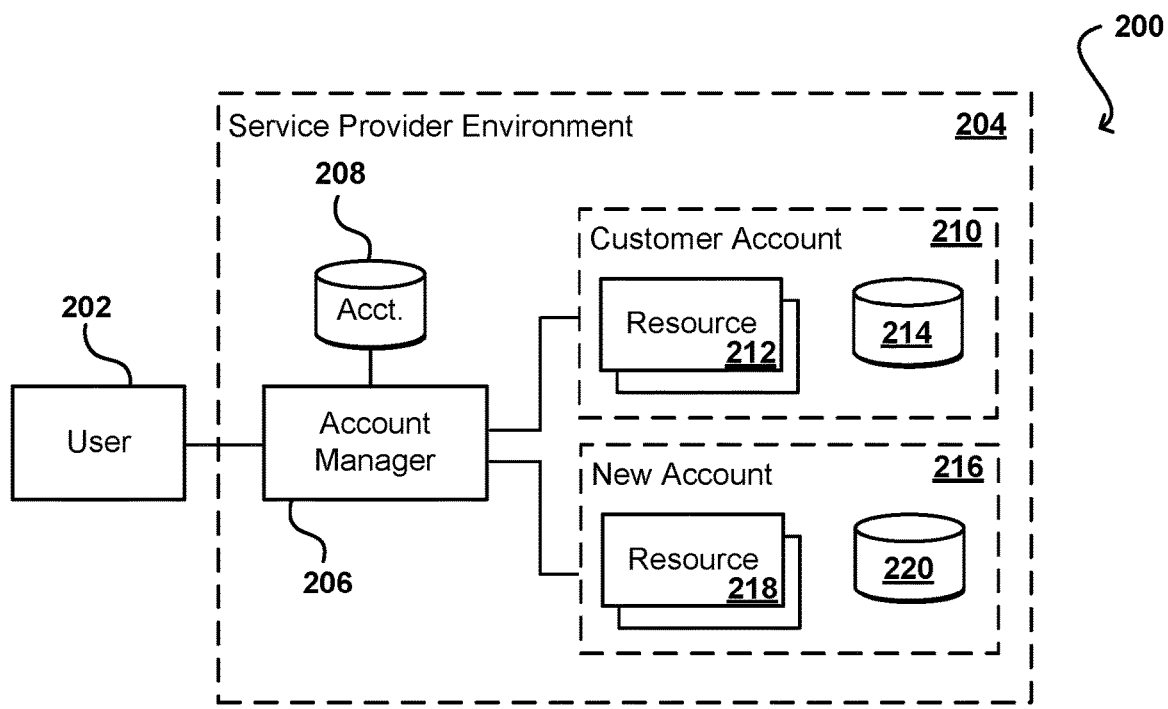
FIGS. 2A and 2B illustrate an example approach wherein a data snapshot is obtained for a new account, which enables an entity associated with the new account to exfiltrate the data in accordance with various embodiments.
Figure 2B:
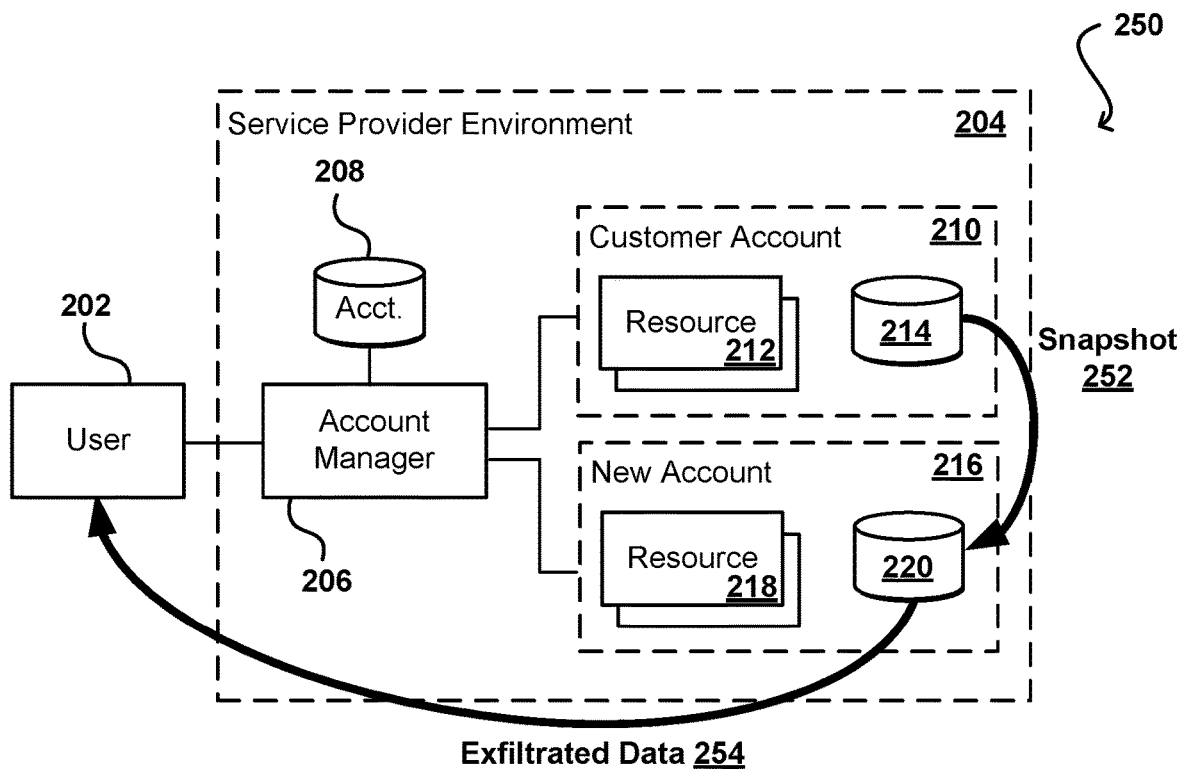

As an example, FIGS. 2A and 2B illustrate an example situation wherein compromised credentials can be used to exfiltrate customer data in accordance with various embodiments. In the situation 200 of FIG. 2A, a computing device 202 associated with a user is able to make calls across at least one network into a service provider environment 204. Various other types or designations of environments can be used as well, such as may include resource provider environments, shared resource environments, multi-tenant environments, and the like, where portions of physical and/or virtual resources can be allocated to perform various tasks for one or more customers on an as-needed or otherwise allocated basis. The user can provide one or more credentials that are associated with a customer account 210. The user may or may not have authorization to utilize the customer credentials. In this example, the user request can be submitted or directed to a service such as an account manager 206, which can authenticate the customer credentials (such as by contacting a credential management service) and determine the corresponding account information from an account repository 208 or other such data source. In this example, the user can request that a new account 216 be created in the resource provider environment, which can have one or more resources 218 (physical or virtual) and data repositories 220 allocated for access under the account. In at least some embodiments, the resources available under the new account 216 can be similar to, or a subset of, the resources 212 and repositories 214 available under the customer account 210 associated with the customer credentials. As mentioned, the new account 216 may or may not be linked to the existing customer account 210.

The ability to gain access under the customer credentials also enables the user to perform various other tasks associated with the customer account 210. For example, the user 202 can request that a snapshot 252 be generated that includes the data for a table, repository, or other data source associated with the customer account as illustrated in the example situation 250 of FIG. 2B. The snapshot 252 can include a representation of the state of the customer repository, or specific fields in that repository, at a particular point in time. The user can then cause this snapshot 252 to be mounted to the new account 218 in order to cause the customer data to also be stored and/or available from one or more repositories 220 in the new account 216. Once mounted, the user can cause some or all of that data 254 to be exfiltrated from the repository, either to another location in the resource provider environment 204 or external to the environment. Since the user accessed the account with valid credentials, the system may allow the exfiltration of the data per security policies corresponding to the customer account. Conventional approaches would have difficulty in real time determining that the activity is likely fraudulent and preventing the exfiltration of the data.

Accordingly, approaches in accordance with various embodiments can monitor various types of account-related activity, as may relate to access requests and permissions granted to accounts not directly owned by specific customers. Approaches can also attempt to automatically determine appropriate mitigations for this potentially fraudulent activity, and apply the mitigations in near real time in order to reduce the risk of exposing data to unauthorized accounts. The approaches can also dynamically determine or adjust the mitigations, such as to block, alert, apply a rate limit, or terminate the linked or non-linked account, based upon factors such as confidence, risk score, and account reputation, among other such factors. As discussed in more detail elsewhere herein, various approaches can enable a customer (or other authorized user or entity) to also set or adjust at least some of the mitigations, such as through a customer interface or API, among other such options.

Various heuristics can be used to make these and other mitigation decisions. The heuristics can include factors such as account age, geo-location of the requestor, console login history, browser fingerprint, email domain, and the like. Any unexpected values or variances can be determined to indicate potentially suspicious activity. In some embodiments these various factors can be examined and an overall threat score (or other such value) determined. The value can then be compared against one or more thresholds to determine the appropriate mitigation. There can also be risk or importance scores applied to the data or customer account itself, which can affect which mitigation is selected or the values of the various mitigation thresholds. Other factors can be considered as well, such as may include the API calls made for the access, the IP address used, or the account(s) to which the access is linked. Further, the type of payment instrument used can be considered, such as whether the instrument was a prepaid instrument, where the payment was made, and the account address matching the payment. A determination can also be made as to whether there was any previous abusive, fraudulent, or suspicious activity detected for a particular account, location, customer account, linked account, and the like. Various other factors, or combinations of factors, can be considered as well within the scope of the various embodiments.

Figure 3:
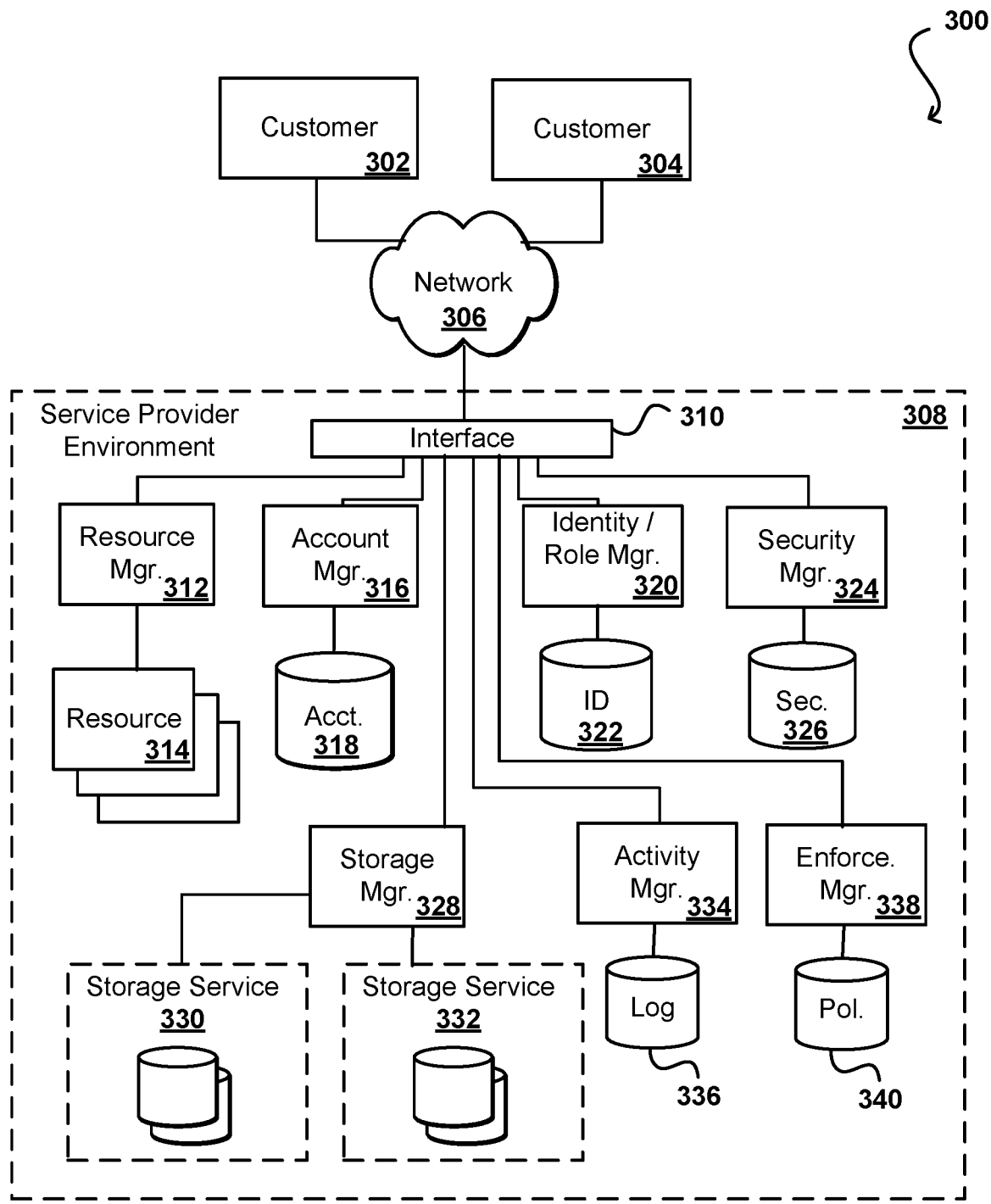
FIG. 3 illustrates an example environment in which potentially fraudulent activity can be detected in accordance with various embodiments.

FIG. 3 illustrates an example system 300 that can be used to implement aspects of the various embodiments. In this example, two customers 302, 304 are able to make calls across at least one network 306 to be received to an interface layer 310 of a resource provider environment. As mentioned previously, an interface layer can include various routing components, switches, APIs, load balancers, and other components or services that can allow for communications between systems, services, and components inside and outside the service provider environment. For this example, a first customer 302 is an authorized customer having a valid account with the provider and obtaining credentials for accessing resources under that account. The second customer 304 can have obtained the credentials that enable the second customer to perform actions permitted under the first customer account. The second customer may or may not have been authorized to obtain those credentials.

As discussed with respect to FIGS. 2A and 2B, the second customer 304 can present credentials that enable the customer to obtain an allocation of resources 314 for a new account, or existing account, generated using the credentials. Once allocated, the customer 304 can utilize those resources under the account to perform various actions associated with the first customer 302. For example, the customer 304 can utilize the compromised credentials or assumed role to obtain a snapshot of data stored in one or more storage services 330, 332 for the first customer 302 and then mount that snapshot to a repository allocated for the customer 304 under the new account. Other methods of obtaining the data besides snapshotting can be used as well within the scope of the various embodiments.

In this example implementation, an enforcement manager 338 or other such service can monitor information about the access, such as by obtaining information from one or more authoritative sources, and attempt to determine whether the activity is fraudulent or suspicious, or determine a risk score for the activity, among other such options. The enforcement manager can also attempt to perform various remedial actions or mitigations in response to the determinations. In this example, the enforcement manager 338 can work with an activity manager 334 or other such component that can provide information regarding any relevant request or activity detected in the environment 308. In some embodiments specific types of activities or requests can be designated, as well as requests on specific accounts or for specific types of resources, among other such options. For each such activity, the enforcement manager 338 can contact various other managers or data sources to obtain information relating to the activity, or a source of the activity. The enforcement manager can also determine at least one appropriate policy for the activity, such as from a policy repository 340, to enforce for the activity.

There are various types of data, and data sources, that the enforcement manager can utilize to make a determination as to any fraudulent aspects of the activity. For example, in this figure the enforcement manager 338 is able to communicate with an account manager 316 to determine information about the customer account and/or the new account, as may be maintained in an account data store 318 or other such location. For example, information can be obtained about the age of the account, the login history, and the activity determined on the account. New accounts or accounts only accessed to perform specific tasks may be indicative of fraudulent activity. Information such as the geo-location, network domain, or browser fingerprint can also be indicative of potentially fraudulent activity if the values differ from prior values, or deviate by more than a determined amount. For example, geo-locations within a particular city may be allowed, such as where a company is headquartered, but locations outside that city or other designated region may be flagged as suspicious if no other such activity has been detected on that account. Further, if all previous communication on an account has come from a set of locations, and a new request to mount a snapshot is received from a different location, then that request may be flagged as suspicious. The account manager can also provide information about the type of payment provided, such as to whether the payment was via a prepaid card or account or whether the payment was by a bank account or other verifiable source. The information can also indicate whether the address or other identifying information matches the payment information on file for that account. Also, the use of the same payment information across multiple unlinked accounts may be deemed to be suspicious.

The enforcement manager 338 can also work with an activity manager 334 to determine actions taken by the second customer 304, as well as actions taken for the customer account, new account, snapshot, or other such relevant aspects. For example, the activity manager 334 can provide information about which APIs were used to obtain snapshot information, which related calls were made, when calls were made, the geolocations, domains, or IP addresses from which calls were made, and other such information. These values can be compared against expected values, as well as against values determined to correspond to fraudulent activity, in order to determine whether any aspects or activity are at least suspicious. Other activity for the second customer 304 can be analyzed as well, such as to determine whether the customer is creating multiple new accounts and obtaining multiple snapshots, which can be indicative of fraudulent activity. Actions taken with respect to the data, such as attempting the export the data to a suspicious location or perform other suspicious activities can also be determined.

The enforcement manager 338 in this example can also work with a storage manager 328. The storage manager can be responsible for managing storage to one or more storage services 330, 332, as may include a block storage service, archival storage, disk-based persistent storage, and the like. The information analyzed can include information about the type of storage used, number of different accounts storing data in a storage service, frequency or reads versus writes, and other types of activity. For example, a customer creating a number of new accounts, mounting snapshots, exfiltrating the data, then doing little else can be indicative of fraud.

The enforcement manager 338 can also work with an identity manager or role manager 320, which can be related to, or separate from, the identity provider 118 discussed with respect to FIG. 1. The identity manager can perform tasks such as to store credentials, usernames, passwords, and other information for each customer, as well as the accounts with which those customers are associated. The identity manager can also track information such as browser or customer fingerprints, which can be used to determine unique machines or applications used to access the various resources and provide communications. For example, a customer might utilize a fixed number of discrete machines to access an account, and any machine submitting requests on that account might be flagged as potentially suspicious. A browser or device fingerprint can be based upon any appropriate type of information that is identifying of a particular device, such as may include the software version number, plugins, processor identifier, operating system version, system characteristics, and the like. In some embodiments the level of suspicion might be based upon the amount of difference, as there may be some allowance for upgrades or software updates, etc. In some embodiments the fingerprints can be tracked across accounts as well, such that a single machine used to access multiple unlinked accounts might be flagged as suspicious. A role manager, which can be separate or the same as the identity manager, can also track type number and types of roles associated with a particular customer or customer account, and determine whether the type of use, or requested use, is consistent with the type of role, and whether the types of roles across accounts are consistent. Other information can be tracked as well, such as the frequency with which the customer logs in or performs actions under each role, etc.

The enforcement manager 338 can also work with a security manager 324, which can be internal or external to the service provider environment 308. The security manager can track determinations of fraud or suspicious activity, and can track the activity with respect to various customers, accounts, roles, or other entities or designations. The enforcement manager can determine, for a particular customer activity, whether that customer has previously been determined to demonstrate suspicious or fraudulent behavior, and if so whether the behavior is similar to the activity currently being monitored. If so, a relatively high risk score can be generated that indicates a higher likelihood of fraud for the current behavior. The security information can also be tracked by credential, role, user, device fingerprint, etc.

In some embodiments, the enforcement manager 338 can contact each of these managers or other such services to obtain one or more risk scores, or other such metrics, from each of the managers. In some embodiments the enforcement manager can obtain information from each manager or service that can instead enable the enforcement manager to generate respective risk scores. The enforcement manager 338 can then analyze the various risk scores to generate an overall risk score for a particular task or instance of customer activity. The overall risk score can be an average risk score, the highest risk score, a sum of the individual risk scores, or a weighted average or combination of the various risk scores. In some embodiments, machine learning can be used to determine and update the various weightings over time, such that the relative importance of each factor can be considered appropriately. In other embodiments more important factors might instead be configured to generate higher risk scores, among other such options. The risk scores, or other determined values, can be indicative of a likelihood that an account was created for fraudulent purposes, the credentials were compromised, the access is fraudulent, etc.

The overall risk score can then be analyzed to determine an appropriate course of action to take in response to the activity. For example, a risk score below a maximum acceptance threshold might cause the activity to be determined to likely correspond to normal, expected, or acceptable behavior, such that no remedial or other actions are taken with respect to the activity. For a score above the maximum acceptance threshold, which could designate suspicious behavior, a log entry or notification can be generated for subsequent analysis and action. For a score above a third threshold, an alarm might be generated indicating that highly suspicious or likely fraudulent behavior has been detected, such that an authorized user or administrator can determine an appropriate action to take. In some embodiments, a score above a fourth threshold can cause a remedial action to be taken automatically, such as to cut off access for a customer, delete an account, revoke credentials, delete customer data, etc. The action taken in at least some embodiments can depend upon the risk score, the type of customer activity, the assumed role, or other such factors. The actions can be designated by a customer, the resource provider, or another such entity, and in at least some embodiments can be adjusted over time. In some embodiments a customer can adjust the values or number of thresholds, in order to increase or decrease the number of alarms and automated actions taken, and can in some instances adjust the actions taken for each threshold. Various other adjustments can be made as well within the scope of the various embodiments. In at least some embodiments the thresholds and actions can be provided via one or more policies for a customer account, as may be stored in a policy repository 340 or other such location. Various other rules, guidelines, or other such criteria can be specified as well. These can include, for example, providing isolations such that new accounts cannot be launched for a customer, blocking inbound or outbound requests, performing rate limiting, etc. Further, firewall rules can be applied that are opaque to the storage systems and that are inaccessible to the customers and/or users. In some embodiments a customer might be sent a request or notification for a suspicious action, and have to confirm the action for that action to be executed. Other actions can include limiting a number of volumes to which a linked or unlinked account can clone snapshots, at least over a period of time. In some cases the account itself may be deleted.

In some embodiments there can be various controls used to implement these actions. The controls can function as part of an abstraction layer, which can perform tasks such as to block the cloning of a snapshot outside of a specific customer account. The controls can also enable specifying or modifying the heuristics used to determine risk and take the appropriate actions. The controls can also enable users to specify the thresholds or conditions under which specific actions are to be taken, among other such options. The controls could also enable customers to specify specific values for activities performed under the account. For example, a customer might be able to specify that the customer will only submit requests from a certain region or domain. The customer might also specify a maximum frequency of operations or type of operation to be performed under a certain role, among other such options. For example, a customer might be able to specify that only accounts created from a specific domain are allowed to perform certain operations, such as mutating operations on the customer account. A customer might also be able to specify other values as well, such as never allowing a prepaid credit card for mutating operations or allowing an account less than a minimum number of days old to access specific resources in a customer cloud or allocation. Some controls can also enable a customer to make changes, obtain reports of the results, then make further adjustments as appropriate.

Figure 4:
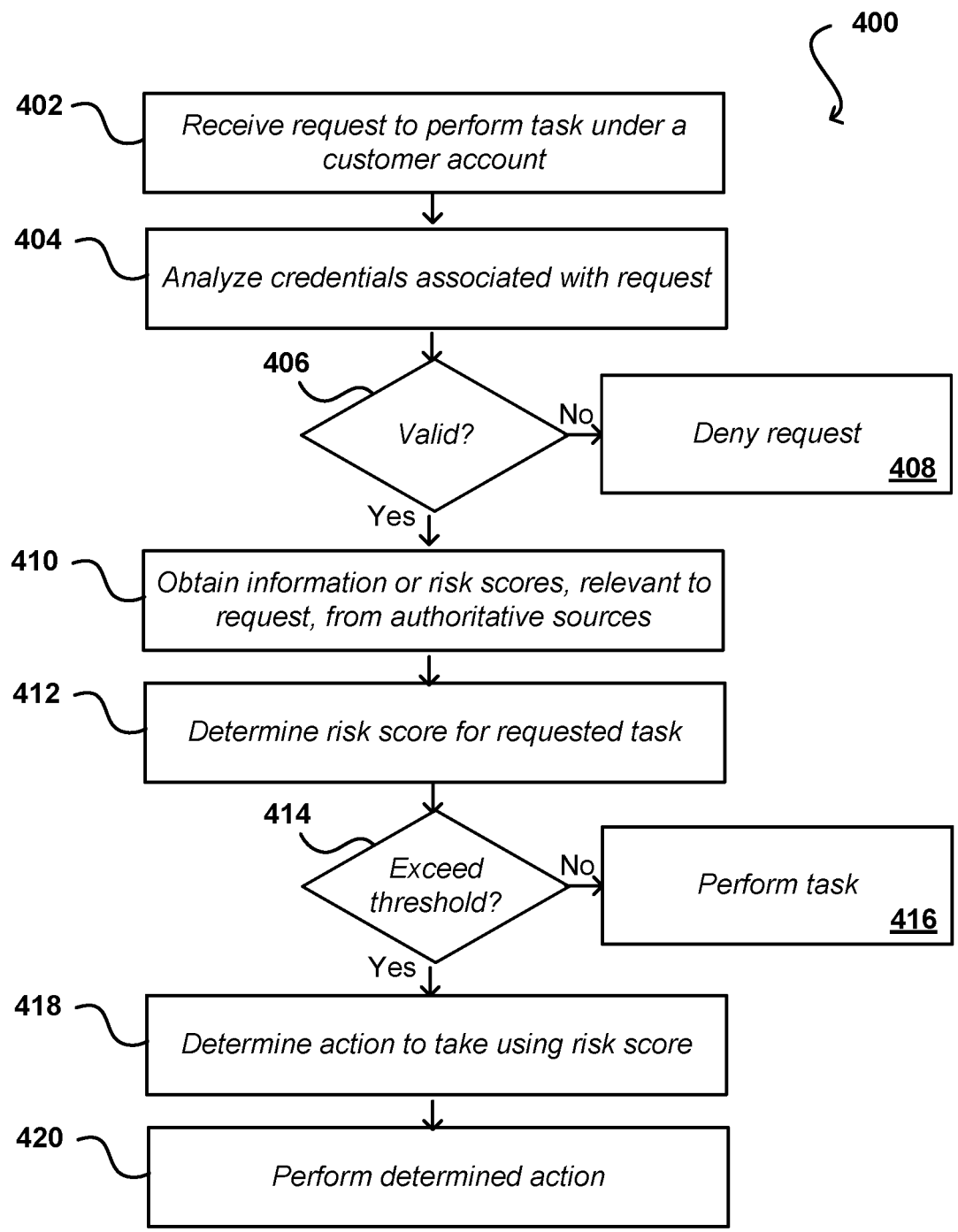
FIG. 4 illustrates an example process for determining potentially fraudulent activity that can be utilized in accordance with various embodiments.

FIG. 4 illustrates an example process 400 for determining and acting upon potentially fraudulent activity that can be utilized in accordance with various embodiments. It should be understood that for this and other processes discussed herein that additional, fewer, or alternative steps can be performed in similar or alternative steps, or in parallel, within the scope of the various embodiments unless otherwise stated. In this example, a request is received 402 to perform a task under a customer account. The request can include customer credentials, or may be received under a session initiated using those customer credentials, among other such options. As mentioned, in at least some embodiments the task can include various actions or functions, such as to create a new customer account, mount a snapshot to a data repository, export data from a determined repository, and the like. Before determining to perform the task, the credentials can be analyzed 404 by the receiving service, a remote credential or identity management authority, or another such system or service. A determination can be made 404 as to whether those credentials are valid, in general as well as for the requested task. This can include a determination as to whether the valid credentials authorize the requestor to have the task performed in the resource environment. If the credentials are not valid, or do not provide the necessary permissions for the task to be performed, then the task request can be denied 408.

If the credentials are determined to be valid and the necessary permissions granted, relevant information and/or risk scores can be obtained 410 from one or more authoritative sources. As mentioned, this can include contacting the various authoritative sources to obtain risk scores for information maintained by those sources, or obtaining at least some of that information directly which can enable calculation of the risk scores, among other such options. As mentioned, the authoritative sources can include managers or services relating to security, account management, data storage, customer activity, and the like. The risk scores can be generated based on various types of information discussed elsewhere herein. For example, one authority might generate a risk score based upon factors such as account age, geolocation, console login history, browser fingerprint, and network domain. Another authority might generate a risk score based upon snapshot API calls such as IP address, geolocation, and account linkage. Another might generate a risk score based on information for payment instruments, such as whether the instrument is prepaid, its geo location, and whether it matches the account billing address. Another authority might generate a risk score based on any previous abusive activity detected on customer and linked/non-linked accounts. Any variation from expected values or presence of known suspicious or fraudulent values can result in a higher risk score generated by the respective authority.

An overall risk score for the requested task can then be determined 412 based at least in part upon the individual risk scores. As mentioned, this can include taking the highest risk score, performing an average or weighted average of the risk scores, or performing another mathematical computation or combination of the individual risk scores. The score can be any appropriate score generated on an appropriate scale, such as a value between 0 and 1, or 1 and 10, etc. Once obtained, the risk score can be analyzed to determine 414 whether the risk score meets or exceeds one or more risk thresholds or other such criteria. The thresholds can represent different levels of risk for which different types of actions should be taken. In this example, a risk score below all thresholds (such as might have a risk score below 3 on a 10 scale) can cause the task to be performed 416 as requested, assuming any other criteria are met for the performance. The activity might be logged per a normal activity logging procedure, but in this example no additional logging or notifications are generated corresponding to the request or performance.

If, however, it is determined 414 that the risk score meets or exceeds at least one risk threshold, then an appropriate action can be determined 418 using at least the risk score. As described in more detail with respect to FIG. 5, there can be different actions taken for different risk scores as those scores exceed different thresholds. Various other factors can be considered as well, such as the sensitivity of the data corresponding to the task or the type of task to be performed, among other such options. For example, the actions can include actions such as generating a notification, generating an alarm, throttling requests, denying requests, blocking future requests, terminating accounts, and so on. Various combinations of these and other actions can also be performed. Once the appropriate action is determined, that action can be performed 420 with respect to the request. Information for the action can also be stored for future reference such that subsequent requests can be analyzed in light of this information, and in some embodiments this determination can impact the future generated risk scores. In some embodiments, any risk score at or above a certain value, such as above a 9 on a 10 scale, can result in the request automatically being denied and/or the account terminated. In some embodiments the credentials can also be revoked with the customer being notified to obtain new credentials for system access.

Figure 5:
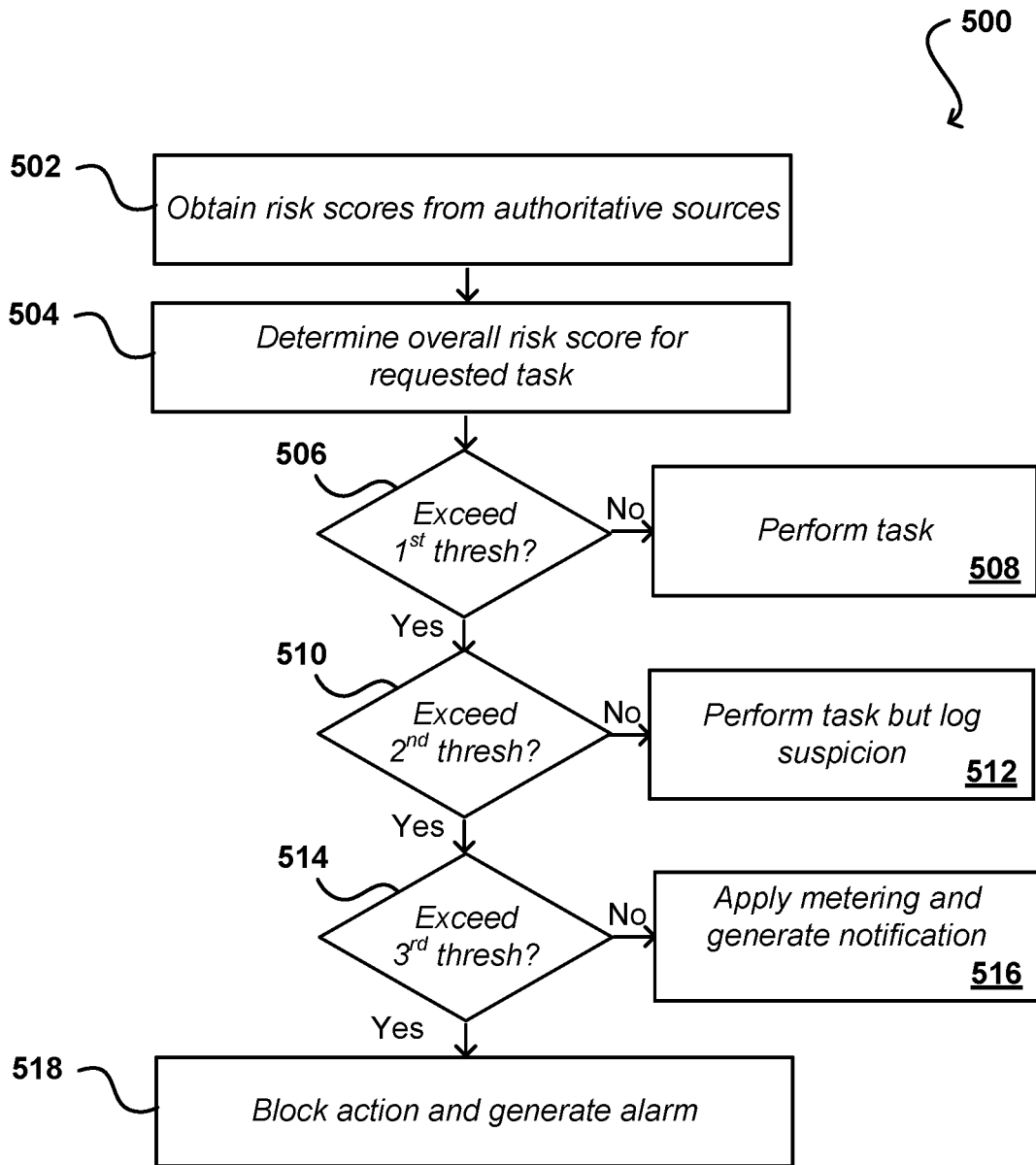
FIG. 5 illustrates an example process for determining one or more actions to be taken for potentially fraudulent activity that can be utilized in accordance with various embodiments.

FIG. 5 illustrates another example process 500 for determining an action to take for a suspicious request that can be utilized in accordance with various embodiments. In this example, risk scores are obtained 502 for a number of authoritative sources, such as those discussed with respect to the process of FIG. 4. The risk scores can be generated by the sources themselves, or the sources can provide information useful for calculating the individual risk scores. Further, some authoritative sources may store multiple types of information such that multiple risk scores may be generated for a single source, among other such options. As mentioned, other types of scores or values can be generated as well that can be indicative of a type or level of suspicious or fraudulent activity. In this example, the individual scores are used to determine 504 an overall risk score for the requested task, such as may involve performing an averaging or weighted combination of the individual risk scores, or taking the highest individual risk score, among other such options. Other factors may be considered in the overall risk score as well, as may relate to the type of request, type of task, type of customer role or account, and other such factors.

Once an overall risk score is determined, the risk score can be evaluated against a set of criteria or thresholds to determine an appropriate action to take for the request. If it is determined 506 that the risk score does not exceed a first threshold, such as a minimum risk threshold or a maximum allowable risk threshold, then the task can be performed 508 as requested. The processing can occur with no additional steps taken, other than potentially logging the activity as per normal operating procedure. If it is determined 510 that the risk score exceeds a first threshold but not a second, higher threshold, then the task can be performed 512 but a log entry or other recording of the potentially suspicious activity can be generated. This can correspond to activity that is suspicious, and might be worth subsequent investigation, but does not rise to the level of risk or suspicion that the task should not be performed. As with other thresholds or actions, these can be adjustable or determinable by the customer or provider, or can be learned and adjusted over time using machine learning or another such process. Further a user can specify specific actions to take for specific values or variations, as discussed elsewhere herein.

Figure 6:
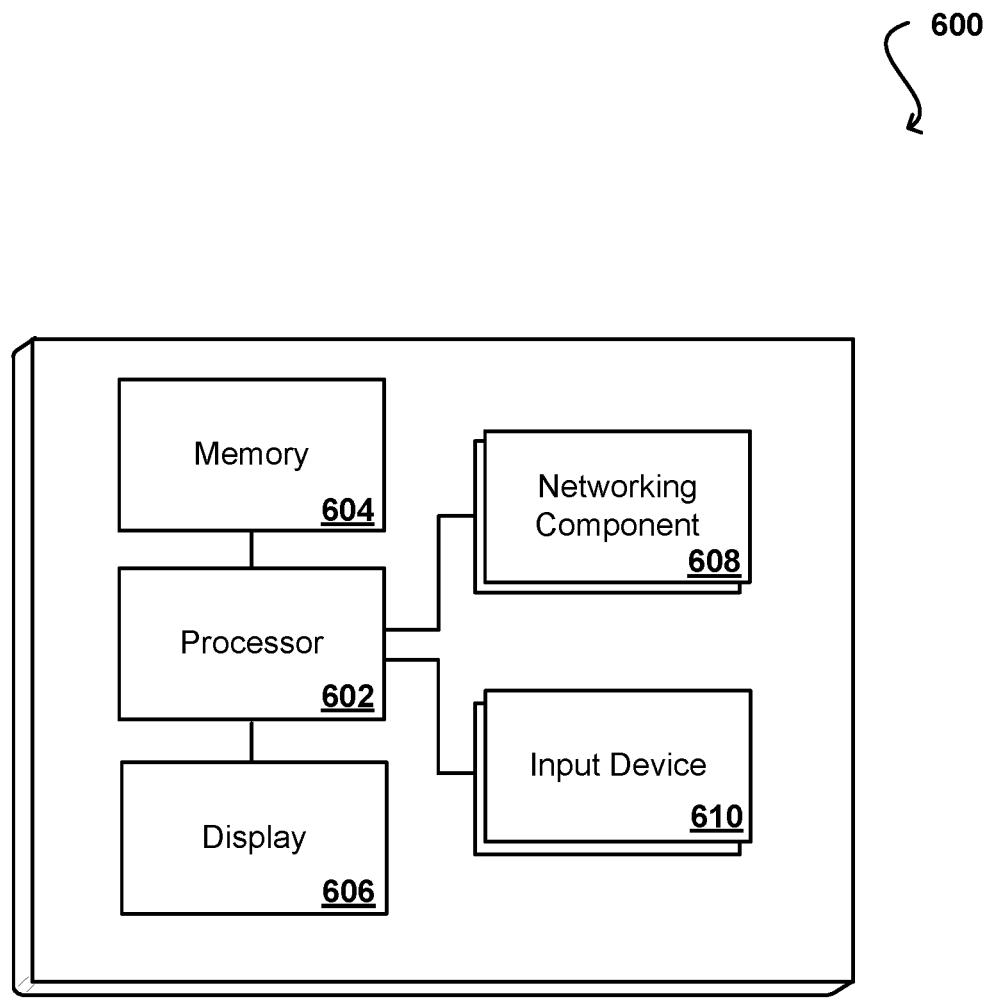
FIG. 6 illustrates example components of a computing device that can be used to implement aspects of various embodiments.

FIG. 6 illustrates a set of basic components of an example computing device 600 that can be utilized to implement aspects of the various embodiments. In this example, the device includes at least one processor 602 for executing instructions that can be stored in a memory device or element 604. As would be apparent to one of ordinary skill in the art, the device can include many types of memory, data storage or computer-readable media, such as a first data storage for program instructions for execution by the at least one processor 602, the same or separate storage can be used for images or data, a removable memory can be available for sharing information with other devices, and any number of communication approaches can be available for sharing with other devices. The device may include at least one type of display element 606, such as a touch screen, electronic ink (e-ink), organic light emitting diode (OLED) or liquid crystal display (LCD), although devices such as servers might convey information via other means, such as through a system of lights and data transmissions. The device typically will include one or more networking components 608, such as a port, network interface card, or wireless transceiver that enables communication over at least one network. The device can include at least one input device 610 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

As discussed, different approaches can be implemented in various environments in accordance with the described embodiments. As will be appreciated, although a Web-based environment is used for purposes of explanation in several examples presented herein, different environments may be used, as appropriate, to implement various embodiments. The system includes an electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle©, Microsoft*, Sybase© and IBM© as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
    enabling a customer account to specify at least one remedial action to be associated with a set of remedial actions and a set of risk scores;
    determining that at least one risk score of the set of risk scores is associated with at least one aspect of a request to perform a task using one or more computing resources;
    providing a machine learning algorithm trained using factors that change the set of risk scores to identify relations between the factors;
    updating the machine learning algorithm using remedial data that is associated with the at least one remedial action;
    determining, using the updated machine learning algorithm, individual weightings for the set of risk scores;
    determining an overall risk score for the request based at least in part on the individual weightings; and
    generating an alarm to indicate fraudulent activity based in part on the overall risk score exceeding a risk alarm threshold.

2. The computer-implemented method of claim 1, further comprising:
    determining the set of risk scores based in part on a behavior associated with the request being suspicious or fraudulent according to previous confirmed suspicious or fraudulent behavior for the customer account.

3. The computer-implemented method of claim 1, further comprising:
    dynamically adjusting the at least one remedial action based in part on further changes to the set of risk scores using input through an application programming interface (API).

4. The computer-implemented method of claim 1, further comprising:
    determining the overall risk score by additionally performing at least one of determining an average score of the set of risk scores, taking a highest score of the set of risk scores, performing a mathematical combination of the set of risk scores, or determining a weighted average of the set of risk scores.

5. The computer-implemented method of claim 1, further comprising:
performing the at least one of the remedial action based in part on the alarm indicating the fraudulent activity.

6. The computer-implemented method of claim 5, wherein the at least one of the remedial action comprises at least one of logging information for the request, generating a notification corresponding to the request, denying the request, seeking confirmation from the customer account, or metering requests associated with the customer account.

7. A system, comprising:
at least one processor; and
memory including instructions that, when executed by the at least one processor, cause the system to:
enable a user to specify at least one remedial action to be associated with a set of remedial actions and a set of risk scores, wherein at least one risk score of the set of risk scores is associated with a task using one or more computing resources;
provide a machine learning algorithm trained using factors that change the set of risk scores to identify relations between the factors;
update the machine learning algorithm using remedial data that is associated with the at least one remedial action;
determine, using the updated machine learning algorithm, individual weightings for the set of risk scores; and
generate an alarm to indicate fraudulent activity based in part on an overall risk score for the request exceeding a risk alarm threshold, the overall risk score based at least in part on the individual weightings.

8. The system of claim 7, wherein the instructions when executed further cause the system to:
determine the set of risk scores based in part on a behavior associated with the request being suspicious or fraudulent according to previous confirmed suspicious or fraudulent behavior for the customer account.

9. The system of claim 7, wherein the instructions when executed further cause the system to:
dynamically adjusting the at least one remedial action based in part on further changes to the set of risk scores using input through an application programming interface (API).

10. The system of claim 7, wherein the instructions when executed further cause the system to:
determine the overall risk score by additionally performing at least one of determining an average score of the set of risk scores, taking a highest score of the set of risk scores, performing a mathematical combination of the set of risk scores, or determining a weighted average of the set of risk scores.

11. The system of claim 7, wherein the instructions when executed further cause the system to:
performing the at least one of the remedial action based in part on the alarm indicating the fraudulent activity.

12. The system of claim 11, wherein the at least one of the remedial action comprises at least one of logging information for the request, generating a notification corresponding to the request, denying the request, seeking confirmation from the customer account, or metering requests associated with the customer account.

13. The system of claim 7, wherein the instructions when executed further cause the system to:
generate the overall risk score that is additionally based in part on one of an average score, a highest score, performing a mathematical combination, or a weighted average of the set of risk scores.

14. The system of claim 7, wherein the instructions when executed further cause the system to:
analyze, by a plurality of authoritative sources, stored information associated with at least one of the customer account, a submitter of the request, or the one or more remote computing resources to determine the set of risk scores.

15. The system of claim 14, wherein the plurality of authoritative sources comprises at least one of an account manager, a storage manager, an identity manager, a security manager, a resource manager, an activity manager, or a fraud manager.

16. The system of claim 7, wherein the instructions when executed further cause the system to:
store prior remedial data for prior ones of one or more remedial actions to a fraud database, the prior remedial data accessed for the remedial data to perform the updating of the machine learning model.

17. The system of claim 7, wherein the instructions when executed further cause the system to:
determine an initial action to take for the request based at least in part on the overall risk score; and
perform the initial action with respect to a second account using the one or more remote computing resources.

18. The system of claim 7, wherein the instructions when executed further cause the system to:
receive one or more access credentials with the request; and
authenticating the one or more access credentials before determining the overall risk score for the request.

19. A non-transitory computer-readable medium storing instructions which, when executed, cause one or more processors to:
enable a user to specify at least one remedial action to be associated with a set of remedial actions and a set of risk scores, wherein at least one risk score of the set of risk scores is associated with a task using one or more computing resources;
provide a machine learning algorithm trained using factors that change the set of risk scores to identify relations between the factors;
update the machine learning algorithm using remedial data that is associated with the at least one remedial action;
determine, using the updated machine learning algorithm, individual weightings for the set of risk scores; and
generate an alarm to indicate fraudulent activity based in part on an overall risk score for the request exceeding a risk alarm threshold, the overall risk score based at least in part on the individual weightings.

20. The non-transitory computer-readable medium of claim 19, wherein the instructions when executed further cause the one or more processors to:
determine the set of risk scores based in part on a behavior associated with the request being suspicious or fraudulent according to previous confirmed suspicious or fraudulent behavior for the customer account.

* * * * *